Feb. 4, 1969   A. R. HILTON ET AL   3,426,201
METHOD AND APPARATUS FOR MEASURING THE THICKNESS OF FILMS
BY MEANS OF ELLIPTICAL POLARIZATION OF
REFLECTED INFRARED RADIATION
Filed Oct. 12, 1965   Sheet 1 of 2
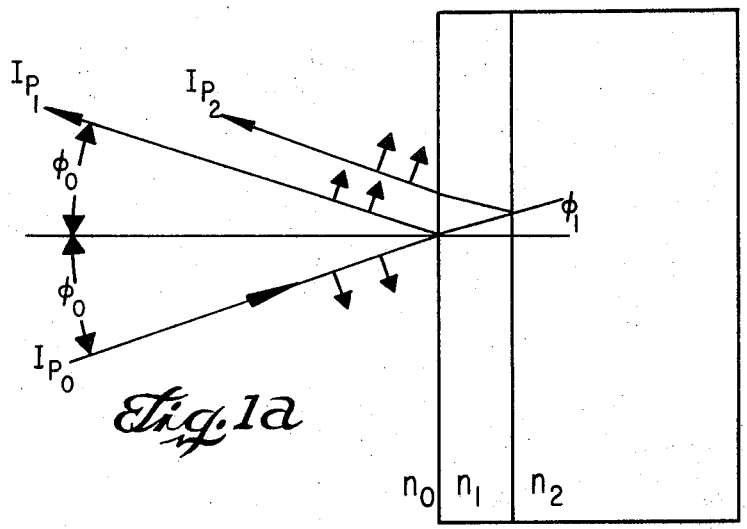
Fig. 1a
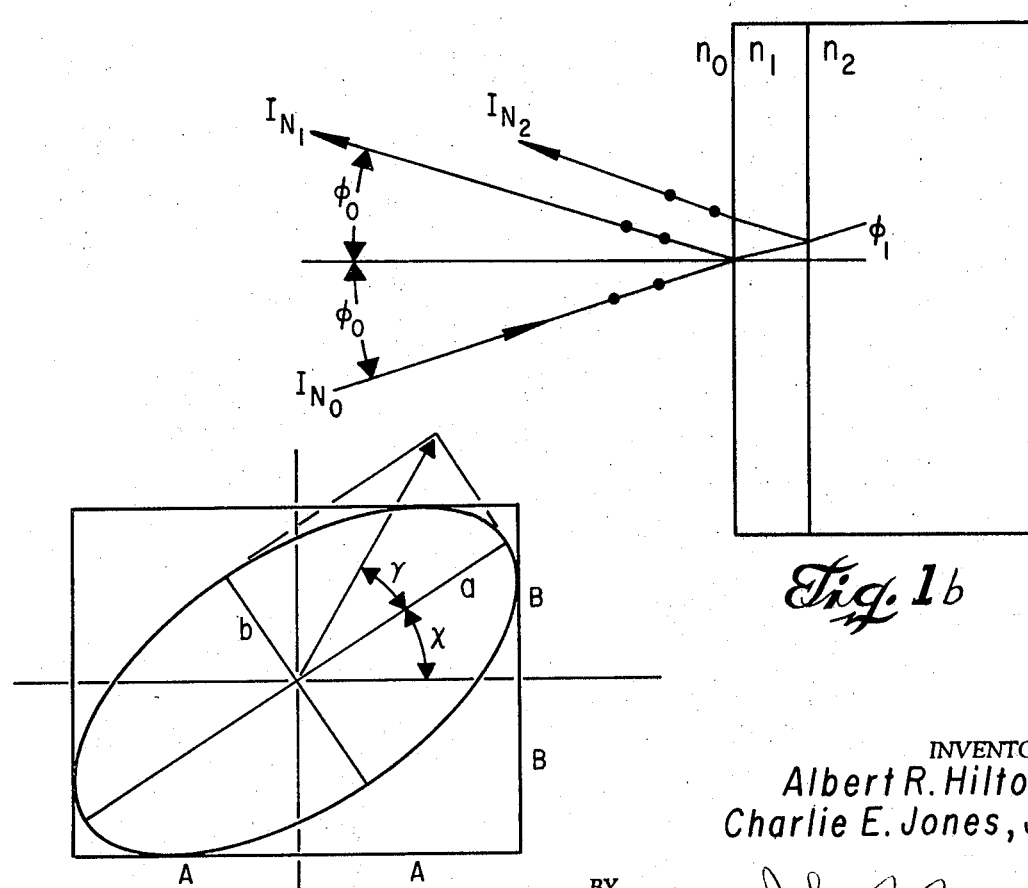
Fig. 1b
Fig. 2
INVENTOR
Albert R. Hilton
Charlie E. Jones, Jr.
BY John D. Graham
ATTORNEY INVENTOR
Albert R. Hilton
Charlie E. Jones, Jr.

United States Patent Office 3,426,201
Patented Feb. 4, 1969

3,426,201
METHOD AND APPARATUS FOR MEASURING THE THICKNESS OF FILMS BY MEANS OF ELLIPTICAL POLARIZATION OF REFLECTED INFRARED RADIATION
Albert R. Hilton and Charlie E. Jones, Jr., Richardson, Tex., assignors to Texas Instruments Incorporated, Dallas, Tex., a corporation of Delaware
Filed Oct. 12, 1965, Ser. No. 495,208
U.S. Cl. 250—83.3          11 Claims
Int. Cl. G01t 1/32

ABSTRACT OF THE DISCLOSURE

Disclosed is a method and apparatus for measuring the thickness of a film on a surface. A beam of infrared energy is reflected from the surface on which the film is deposited, and the reflected beam is elliptically polarized by a suitable polarizer to a degree equal and opposite to the degree of elliptical polarization produced by reflecting the beam from the surface, thereby causing said reflected beam to be plane polarized. The plane polarized reflected beam is then passed through a polarized analyzer, and the polarizer analyzer is rotated 90° with respect to the plane of the plane polarized reflected beam, thereby causing extinction of the light transmitted therethrough, and thereby providing direct measurement of the azimuth angle and phase shift of infrared energy reflected from the surface.

---

This invention relates to a non-destructive method and apparatus for measuring the thickness of layers of material formed on the surface of a substrate material. More particularly, the invention relates to a method and apparatus for determining the thickness of films of material formed on a substrate of the same or dissimilar material by determining the degree of elliptical polarization produced by the oblique reflection of a substanially monochromatic beam of infrared radiation from the film-covered surface without destroying the film or the substrate.

The thickness of a layer or film on a surface is often a critical factor which must be accurately determined to provide a useful device incorporating the film-covered substrate. For example, in the fabrication of many semiconductor devices, particularly such devices as integrated circuits and radiation detectors, part of the device is often advantageously formed by the epitaxial deposition of crystalline semicoductor material. In many of these devices, the thickness of the epitaxial layer is a critical factor in determining the operating characteristics of the device. Accordngly, a non-destructive method of accurately measuring the thickness of epitaxial layers is essential to the economical production of devices incorporating epitaxially formed layers.

In the past infrared scan techniques have been used to measure the thickness of epitaxially formed layers of semiconductor material. In this method of measurement, a beam of infrared radiation is reflected from the film-covered surface. Part of the incident light beam is reflected from the film surface at the incident angle. The remaining part of the incident beam is refracted into the film, partially reflected at the film-substrate interface, and in turn partially transmitted back through the film to the film-air interface. Due to the phase lag which occurs as the refracted beam travels through the film, the phase angle of the refracted beam is different from that of the reflected beam. Both beams combine to produce a resultant wave of the frequency of the incident beam but of different intensity and phase angle from that of either the reflected portion or the refracted portion of the incident beam. Furthermore, the intensity of the combined wave varies with the phase difference. The thickness of the film is determined by varying the wavelength of the incident beam and measuring the maximum and minimum reflected intensity. The intensity variation depends upon the number of free carriers available for absorption and on the wavelength of the infrared energy. Absorption by conduction electrons increases with the square of the wavelength. However, when the thickness of the layer is less than about 5 microns the second interference peak is in the near infrared region. The magnitude of the free carrier absorption in the near infrared region is drastically reduced thus causing a decrease in the intensity of the interference pattern. Accordingly, the wavelength location of the maximum reflected intensity peak becomes difficult to determine.

It is therefore an object of the present invention to provide a method for determining the thickness of thin films of material. It is another object of the invention to provide a non-destructive method of measuring the thickness of epitaxial layers of semconductor material and to provide a method and apparatus for accurately determining the azimuth angle and phase difference of a beam of infrared energy obliquely reflected from an unknown thickness of epitaxial film over a range of thicknesses from less than 1 micron to about 40 microns. It is a further object to provide a method and apparatus for measuring the thickness of thick films opaque in the visible region. Still a further object is to provide an ellipsometer which operates on infrared energy of about 55 microns wavelength.

A particular feature of the invention is that the thickness of the film is directly derived from the azimuth angle and the phase difference of a beam of elliptically polarized light obliquely reflected from a film-covered surface. Thus the output from the measuring apparatus can be digitized and fed directly into a computer to provide a control means for a continuous process.

These and other objects, features and advantages of the invention will become more readily understood in the following detailed description taken in conjunction with the appended claims and attached drawings in which:

FIGURES 1a and 1b are diagrammatic illustrations depicting the reflection and refraction of a plane polarized light beam incident to the surface of a film-covered substrate;

FIGURE 2 is a diagrammatic sketch depicting the electric vector of an elliptically polarized light beam.

Figure 3:
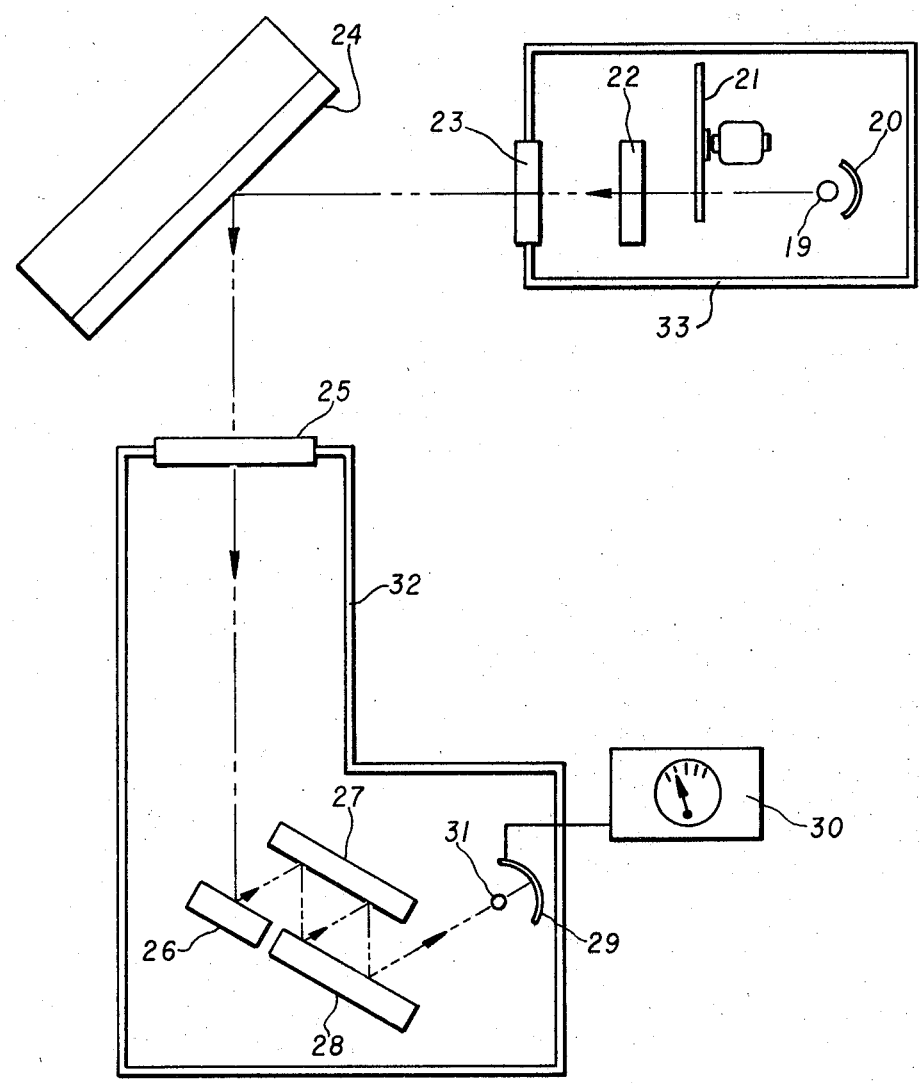
FIGURE 3 is a schematic representation of an ellipsometer suitable for determining the azimuth angle and phase shift of an infrared beam reflected from the surface of a film-covered substrate.

Optical interference occurs when light is obliquely reflected from a film-covered surface. Generally, the reflected light is elliptically polarized. Elliptical polarization is conventionally characterized by two angles; $\psi$, the azimuth angle, and $\Delta$, the phase shift. $\psi$ and $\Delta$ can be calculated from optical constants of the materials for any given thickness of film at any specified wavelength and angle of incidence.

In accordance with one aspect of the invention, the thickness of epitaxial layers of semiconductor material is determined by an ellipsometric measuring method utilizing an ellipsometer wherein a beam of polarized monochromatic infrared radiation is directed at the surface of the epitaxial layer. The beam is partially reflected from the surface of the layer and partially reflected from the optical interface of the epitaxial layer and the substrate.

Reflection occurs at the layer-substrate interface when the optical constants of the substrate and layer are not equal. The beam reflected from this interface is parallel to the reflected incident beam and recombines therewith to produce a resultant reflected beam. However, the phase of the second beam is shifted. Thus, the combined beam of reflected light is elliptically polarized. The azimuth angle and phase shift of the combined beam is then measured by phase compensation. Thus, if the optical properties of the epitaxial layer are known, the degree of elliptical polarization of the combined beam is a direct index of the thickness of the epitaxial layer.

The elliptical polarization of light reflected obliquely from a film-covered surface is a natural phenomena which is advantageously utilized in the invention to provide a non-destructive method of measurement. Accordingly, the invention will be more fully understood when taken in conjunction with the following description of elliptical polarization.

Natural unpolarized light can be treated as if it were made up of two types of light: $p$ light, polarized in the plane of incidence, and $n$ light, polarized perpendicular to the plane of incidence. The intensity of natural incident light becomes $$I_o = \tfrac{1}{2} I_{p_o} + \tfrac{1}{2} I_{n_o}$$

The natural light reflected from a film-covered surface can be resolved into the $p$ light reflection and the $n$ light reflection, as shown in FIGURES 1a and 1b. Treating the reflected light in this manner makes it easier to visualize how the reflected and refracted rays add together to produce a resultant light wave which is elliptically polarized. The arrows in FIGURES 1a and 1b depict the magnetic vectors $H_p$ and $H_n$. The intensity and phase of $I_{p_1}$ and $I_{n_1}$ depend upon the angle of incidence and the optical constants of the film ($n_1$). The intensity and phase of $I_{p_2}$ and $I_{n_2}$ depend upon the thickness of the film, the optical constants of the film and substrate ($n_1$ and $n_2$) and the angle of incidence.

The two $p$ rays $I_{p_1}$ and $I_{p_2}$ add together to produce a resultant $p$ wave. The amplitude of the electric vector ($E_p$) is given by $$E_p = A_p \sin(\omega t + \theta_p)$$

where $A_p$ and $\theta_p$ are the resultant amplitudes and phase angles obtained by adding $I_{p_1}$ and $I_{p_2}$. The amplitude of the electric vector of the resultant $n$ wave ($E_n$) is given by $$E_n = A_n \sin(\omega t + \theta_n)$$

where $A_n$ and $\theta_n$ are the resultant amplitudes and phase angle obtained by adding $I_{n_1}$ and $I_{n_2}$. The intensities $I_p$ and $I_n$ are equal to the square of the corresponding electric vectors. These two waves then are produced by the simple vectorial addition of simple harmonic motion (displacements in the same direction). The additions of $I_p$ and $I_n$ are not the same, however, since the displacements are in perpendicular directions. The resultant wave from the addition of $I_p$ and $I_n$ lies in the p-n plane (three dimensions rather than two) and can be either plane, circularly or elliptically polarized depending upon the relative magnitudes of the amplitudes and phase angles. In actual practice, the amplitudes are generally not equal, and the resultant light is elliptically polarized. The path of the end point of the resultant E vector would be that of a helix traveling through space in the direction of the reflected light ray.

The elliptically polarized light can be represented by the diagram shown in FIGURE 2. The direction of the light ray is out of the paper. The elliptical path taken by the electric vector is represented by the ellipse with major axis $a$ and minor axis $b$. The ellipse is contained within the amplitude rectangle $2A \times 2B$. The major axis of the ellipse makes an angle X with the plane of incidence and the resultant vibration of the ellipse makes an angle Y with the major axis. The angle Y is given by $$Y = \tan^{-1} b/a$$

The values of X and Y are not directly measured by optical methods. The two quantities that are directly measured are $\psi$, the azimuth angle, and $\Delta$, the phase difference. The azimuth angle is related to the amplitudes and is defined as $$\psi = \tan^{-1} B/A$$

The phase difference $\Delta$ is related to the phase difference between the p- and n-components and is defined as $$\Delta = \theta_p - \theta_n$$

The angles X and Y are related to the angles $\psi$ and $\Delta$ by the equations $$\cos 2\psi = \cos 2Y \cos 2X$$

$$\tan \Delta = \pm \frac{\tan 2Y}{\sin 2X}$$

The angles $\psi$ and $\Delta$ are measured with an appropriate ellipsometer.

FIGURE 3 is a schematic drawing of an ellipsometer which operates in the infrared region according to the invention. In operation, energy from a globar source 19 is reflected from a mirror 20 and passes through an optical chopper 21. The semi-collimated beam is reflected from the film-covered sample surface 24. The light in this path passes through a first infrared polarizer 22 and an infrared quarter wave plate 23. After striking the sample 24, the light is reflected down the second arm of the instrument. It passes through an infrared analyzer polarizer 25 and into a monochromator comprising reflecting plates 26, 27 and 28. The light passing through the monochromator is reflected once from a polished InSb surface 26 and four times from polished NaCl plates 27 and 28. The reflection is at near normal incidence. The resultant light strikes mirror 29 and is focused on a standard thermocouple detector 31. The signal of the detected energy is amplified by any suitable amplification system, such as a standard Perkin-Elmer 13 c.p.s. preamplifier and amplifier. The amplified signal is displayed on a high sensitivity voltmeter 30.

Each arm of the ellipsometer is contained in air tight chambers 32 and 33 so that absorption by atmospheric moisture is minimized in the optical paths. The chambers are flushed with dry nitrogen. The polarizer 22 and polarizer analyzer 25 are suitably mounted so that they may be rotated about the axis of the light beam passing therethrough. Angles of incidence and polarizer readings are read using standard verniers. Optical alignment may be accomplished using front surface mirrors in place of the NaCl plate so that visible light can be used to determine the optical path. After alignment the mirrors are replaced with the NaCl plates and the detector peaked on the infrared energy.

The quarter wave plate 23 must be made from optical material that is bi-refractive. The velocity of light traveling through a bi-refractive material is a function of the angle the electric vector of the light makes with the optical axis of the material. The velocity (and thus the refractive indexes) change from either a maximum or minimum in a direction perpendicular to the optical axis. If the two refractive indexes are accurately known at a particular wavelength, a bi-refractive crystalline material can be carefully oriented using an X-ray diffractometer and a plate cut of sufficient thickness to produce a quarter wave plate. Two light waves of a particular wavelength polarized in and perpendicular to the direction of the optical axis will emerge, after traveling through the plate, separated in phase by 90° ($\lambda/4$).

Selection of the proper optical material for an infrared quarter wave plate is a difficult problem. Most of the optical materials which transmit well in the infrared region are not bi-refractive. Of those that are bi-refractive, either the refractive indexes are not accurately known or the materials cannot be obtained in proper sizes. Natural quartz has been found suitable. It can be obtained in large high quality pieces and its optical constants are accurately known. However, quartz does not transmit well from about 3.5 to about 45 microns so the wavelength selected for the operation of the instrument should be at least 50 microns.

The thickness of the λ/4 plate 23 can be calculated from the difference in the refractive indexes. The proper thickness for a quartz quarter wave plate at 55 microns is about 10 mils.

Any instrument operating in the far infrared is energy limited. The most serious problem encountered in designing a suitable monochromator 26–27–28 is to isolate a band of light of at least 50 microns wavelength without absorbing much, if any, of the available energy. The reflection system described herein takes advantages of the Reststrahlen reflection bands of ionic crystals for energy wavelength isolation. These bands are the reflectivity maxima that occur in ionic crystals because of the strong absorption of infrared energy by the oscillating constituent atoms or ions.

Sodium chloride (NaCl) and indium antimonide (InSb) surfaces have reflectivity maxima of about 90–95% in the region of 50 microns wavelength. Furthermore, sodium chloride (NaCl) has a maximum reflection at about 55 microns and a very low reflectivity out to about 35 microns. This low reflectivity is advantageously used to eliminate high and low wavelength radiation, thus serving as a filter peaked at about 55 microns. However, the sodium chloride reflection peak is somewhat broad and is not a completely satisfactory monochromator. To further isolate a narrow band of infrared radiation the beam is reflected off a surface of indium antimonide. Indium antimonide has a very sharp reflection band at 54.6 microns. Thus, by reflecting the infrared beam off surfaces of both indium antimonide (plate 26) and sodium chloride plates 27 and 28) a high reflectivity peak centered at about 55 microns is provided.

In order for the ellipsometer to function properly, the incident beam must be polarized. Conventional polarizers are produced by shadowing a plastic grating replica with a metal which has high reflectivity in the infrared region. The result is a plastic film covered with a set of closely spaced parallel conducting wires. Of course, the plastic film must be transparent at the wavelength of interest. A spacing of λ/3.5 is required to produce 99% polarization. For a wavelength of 55 microns, this corresponds to about 1600 lines per inch. Wire grid polarizers having 1600 lines per inch are not commercially available.

A suitable grid polarizer can be made from silicon. A high purity silicon substrate is first optically polished and then coated with a film of approximately 3000 A. aluminum. The aluminum film is coated with a conventional photoresist material and then exposed in thin closely spaced parallel lines by conventional photolithographic techniques. After the photoresist material is developed, the exposed aluminum is etched away and the developed photoresist material removed leaving closely spaced parallel ribbons of aluminum on the polished silicon surface. Grid polarizers produced by this method with 5000 lines per inch have produced a measured polarization at 54.6 microns of 95–98% of the light passing through the polarizer.

The conventional ellipsometer has previously found utility as a device for measuring transparent oxide films on semiconductor surfaces. (For example see R. J. Archer, Journal of the Optical Society of America, vol. 52, pp. 907–977.) When the ellipsometer is used in the conventional manner, a set of curves in $\psi$, the azimuth angle, and $\Delta$, the phase difference, are calculated. Conventionally, these calculations are made using a computer program such as that developed and reported by McCrackin and Colson, "A Fortran Program for Analysis of Ellipsometer Measurements and Calculations of Reflection Coefficients from Thin Films," National Bureau of Standards Technical Note 242, May 27, 1964. In practicing the present invention, resort may be had to this conventional method of preparing reference curves. The variables used in the calculation are the optical constants of the substrate ($n_2$, $k_2$), the layer ($n_1$, $k_1$), a convenient angle of incidence, and the wavelength of light used in this measurement. The infrared ellipsometer described herein is then used to measure the azimuth angle and phase shift of an infrared beam obliquely reflected from the film-covered surface. The thickness of the layer is determined by comparing ellipsometer $\psi$ and $\Delta$ values thus obtained with the reference curves.

Operation of the instrument described herein is similar to that of a visible ellipsometer. The light beam from source 19 is semi-collimated, chopped, and passed through the first polarizer 22. The light beam is then passed through the quartz quarter wave plate 23 and reflected from the film-covered surface of the sample 24. As described above, light reflected from a film-covered surface is elliptically polarized. By rotating the first polarizer 22 with respect to the quarter wave plate 23, the incident beam is elliptically polarized to provide an equal but opposite phase shift to that produced by the sample. Thus the light leaving the sample is plane polarized. This point is determined by rotating the first polarizer 22 to the point where the lowest intensity of light is transmitted through the system as indicated by a minimum signal at the voltmeter 30. The polarizer analyzer 25 is simultaneously rotated about the axis of the beam until the plane of polarization is 90° from the plane of the reflected plane polarized light, thus causing total extinction of the light passing through the polarizer analyzer 25 and a zero reading on the meter 30. The angular displacements of the first polarizer 22 and the second polarizer analyzer 25 are direct measurements of the azimuth angle and phase shift of the light beam reflected from the surface 24. These angular displacements are then used to determine values of $\psi$ and $\Delta$ as described hereinabove. The $\psi$ and $\Delta$ values thus obtained are referred to the appropriate reference curves described above for determination of the thickness of the film.

The method and apparatus described have been successfully used to determine the thickness of N-type epitaxial deposits of silicon on N-type silicon, P-type deposits of germanium on P-type germanium, and P-type deposits of GaAs on N-type GaAs. Furthermore, since the apparatus operates in the far infrared region, other types of coatings which are not transparent in the visible range may be accurately measured. For example, coatings of organics on metallic surfaces, organics on semiconductor surfaces, semiconductor material on refractory surfaces, varnish coatings on polished surfaces and the like may be accurately measured as described above. The invention may also be used to measure thick layers of opaque films, such as thick silicon oxide layers on silicon or other substrates. The apparatus may also be readily automated to continuously monitor a continuous operation. The output of the apparatus may conveniently be digitized to feed a process control computer.

It is to be understood that the above-described methods and apparatus are merely illustrative of the invention. Numerous other arrangements may be devised by those skilled in the art without departing from the spirit and scope of the invention as defined by the appended claims.

What is claimed is:

1. The method of measuring the thickness of a film on a substrate surface comprising the steps of:
   (a) reflecting infrared radiation from said surface, and
   (b) measuring the elliptical polarization of the reflected beam.

2. The method of measuring the thickness of a film on a substrate surface comprising the steps of:
   (a) reflecting infrared radiation from said surface, and
   (b) measuring the azimuth angle and phase shift of that portion of said infrared radiation of a wavelength of about 55 microns reflected from said surface.

3. The method of measuring the thickness of a layer of semiconductor material epitaxially formed on a substrate, said layer and said substrate having unequal indexes of refraction, comprising the steps of:
   (a) directing a beam of infrared radiation at the surface of said layer, and
   (b) measuring the elliptical polarization of the beam of infrared radiation reflected from said surface of said layer.

4. The method of measuring the thickness of a film on a surface comprising the steps of:
   (a) reflecting a beam of infrared energy from said surface,
   (b) elliptically polarizing said beam to a degree equal and opposite to the degree of elliptical polarization produced by reflecting said beam from said surface, thereby causing said reflected beam to be plane polarized,
   (c) passing said plane polarized reflected beam through a polarizer analyzer, and
   (d) rotating said polarizer analyzer 90° with respect to the plane of said plane polarized reflected beam, thereby causing extinction of the light transmitted therethrough, thereby providing direct measurement of the azimuth angle and phase shift of infrared energy reflected from said surface.

5. The method of measuring the azimuth angle and phase shift of a beam of infrared energy obliquely reflected from a film-covered surface comprising the steps of:
   (a) passing a beam of infrared energy through a first polarizer and a quarter wave plate,
   (b) reflecting said beam from said film-covered surface,
   (c) passing said reflected beam through a second polarizer,
   (d) rotating said first polarizer on the axis of the light beam until the reflected beam is plane polarized, and
   (e) rotating said second polarizer on the axis of said reflected beam until the plane of polarization of said beam is 90° from the plane of the plane of polarization of said reflected beam, thereby causing extinction of the light transmitted through said second polarizer, whereby the angular displacements of said first and second polarizers indicate the azimuth angle and phase shift of said beam of infrared energy reflected from said film-covered surface.

6. A device for measuring the elliptical polarization of a beam of infrared radiation obliquely reflected from a film-covered surface comprising:
   (a) a source for producing a beam of semi-collimated infrared radiation,
   (b) a first polarizer, positioned in the path of said beam of semi-collimated infrared radiation,
   (c) a quartz quarter wave plate positioned in the path of said beam of semi-collimated infrared radiation,
   (d) means for supporting said film-covered surface in the path of said beam of semi-collimated infrared radiation,
   (e) a second polarizer positioned in the path of the beam reflected from said film-covered surface,
   (f) means for isolating radiation of a wavelength of about $55\mu$ from said beam reflected from said film-covered surface,
   (g) a sensing means responsive to the intensity of said radiation of a wavelength of about $55\mu$, and
   (h) a display means responsive to said sensing means.

7. In an apparatus for determining the azimuth angle and phase difference of a beam of infrared energy obliquely reflected from a film-covered surface including an infrared source, a first polarizer, a quarter wave plate, a polarizer analyzer, a sensing means responsive to the intensity of the reflected energy, and a display means responsive to said sensing means; a monochromator comprising opposed spaced surfaces of indium antimonide and sodium chloride alternately positioned in the optical path of said reflected energy between said polarizer analyzer and said sensing means.

8. In a device for measuring the elliptical polarization of a beam of infrared energy obliquely reflected from a film-covered surface including a source for producing a semi-collimated beam of infrared energy, a first polarizer, a specimen holder, a second polarizer, a monochromator, and a sensing means responsive to the reflected infrared energy; a quartz quarter wave plate positioned between said first polarizer and said specimen holder.

9. The method of isolating essentially monochromatic radiation of about 55 microns wavelength comprising alternately reflecting a beam of infrared radiation from polished surfaces of crystalline NaCl and InSb.

10. The method of producing essentially monochromatic radiation of about 55 microns wavelength comprising the steps of:
    (a) directing a beam of infrared radiation at the surface of an InSb crystal at near normal incidence, and
    (b) directing the beam of infrared radiation reflected from said surface of said InSb crystal at the surface of a NaCl crystal at near normal incidence.

11. The method of producing essentially monochromatic radiation of about 55 microns wavelength comprising the steps of:
    (a) reflecting a beam of infrared radiation off the surface of an InSb crystal,
    (b) reflecting the radiation reflected from said surface of said InSb crystal off the surface of a first NaCl crystal, and
    (c) reflecting the radiation reflected from said first NaCl crystal off the surface of a second NaCl crystal.

References Cited
UNITED STATES PATENTS

| | | | |
|---|---|---|---|
| 2,964,635 | 12/1960 | Harrick | 250—86 |
| 3,027,457 | 3/1962 | Mouly | 250—83.3 |
| 3,206,603 | 9/1965 | Mauro | 250—83.3 |

ARCHIE R. BORCHELT, *Primary Examiner.*

U.S. Cl. X.R.

250—86; 350—1, 152